United States Patent
Sekita

(10) Patent No.: US 7,290,718 B2
(45) Date of Patent: Nov. 6, 2007

(54) RADIO TERMINAL

(75) Inventor: Suguru Sekita, Saitama (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 11/292,727

(22) Filed: Dec. 2, 2005

(65) Prior Publication Data

US 2006/0118625 A1    Jun. 8, 2006

(30) Foreign Application Priority Data

Dec. 3, 2004    (JP)    ............................. 2004-351630

(51) Int. Cl.
*G06K 19/06* (2006.01)
*H04M 1/00* (2006.01)

(52) U.S. Cl. ................. 235/492; 455/550.1; 455/573.3

(58) Field of Classification Search ................ 235/492; 455/575.1, 475.7, 575.3, 550.1
See application file for complete search history.

(56) References Cited

U.S. PATENT DOCUMENTS

| | | | | |
|---|---|---|---|---|
| 6,754,507 B2 * | 6/2004 | Takagi | ...................... | 455/550.1 |
| 6,806,835 B2 * | 10/2004 | Iwai et al. | ................... | 343/702 |
| 6,862,432 B1 * | 3/2005 | Kim | ........................... | 455/80 |
| 6,973,327 B2 * | 12/2005 | Seita | ........................ | 455/550.1 |
| 2004/0229665 A1 * | 11/2004 | Mori | ........................ | 455/575.1 |

FOREIGN PATENT DOCUMENTS

| | | |
|---|---|---|
| CN | 1123476 A | 5/1996 |
| JP | 11-88223 | 3/1999 |
| JP | 2001-5920 | 1/2001 |
| JP | 2002-218031 | 8/2002 |
| JP | 2003347959 A * | 12/2003 |
| JP | 2004-135054 | 4/2004 |
| JP | 2004-280193 | 10/2004 |
| JP | 2004-280193 A | 10/2004 |
| JP | 2004-310257 | 11/2004 |

OTHER PUBLICATIONS

Office Action isued by the Chinese Patent Office on Ju. 8, 2007 in connection with corresponding Chinese Patent Application No.: 200510125618.1.
Translation of the Office Action issued by the Chinese Patent Office on Jun. 8, 2007 in connection with corresponding Chinese Patent Application No.: 200510125618.1.

* cited by examiner

*Primary Examiner*—Thien M. Le
*Assistant Examiner*—April Taylor
(74) *Attorney, Agent, or Firm*—Ostrolenk, Faber, Gerb & Soffen, LLP

(57) ABSTRACT

A radio terminal includes a first case which includes an operation unit and a first antenna, and a second case which includes a display unit and a second antenna and which is foldably connected to the first case via a hinge. The radio terminal performs short-range radio communication with a predetermined communication device by using at least one of the first antenna and the second antenna.

26 Claims, 11 Drawing Sheets

RADIO TERMINAL

BACKGROUND OF THE INVENTION

1. Field of the Invention

The present invention relates to a radio terminal, and more particularly to a folding type radio terminal for performing short-range radio communication with a predetermined communication device.

2. Description of the Related Art

Recently, a non-contact IC card that can be used just by being held to a predetermined reader/writer has been in wide use. This non-contact IC card has been widely used for a prepaid card or the like on a railroad or bus.

Associatively, various technologies that combine such non-contact IC cards with commonly-used portable telephones have been proposed. For example, JP 2001-5920 A discloses a technology of shortening a data communication distance between anon-contact IC card and a reader/writer by disposing a portable telephone therebetween. Each of JP 2004-280193 A, JP 2002-218031 A, and JP 2004-310257 A discloses incorporation of an IC chip constituting a non-contact IC card and an antenna in a portable telephone. JP 2004-280193 A further discloses mounting of a reader/writer for performing short-range radio communication with a non-contact IC card in a portable telephone.

The portable telephone having the non-contact IC card mounted therein has conventionally been configured as shown in FIG. 13. This configuration is disclosed in JP 2004-280193 A. As shown in FIG. 13, a folding type portable telephone 1 is configured by interconnecting: a first case 4 including a key operation unit 2 and a microphone 3; and a second case 7 including a display unit 5 and a receiver 6, via a hinge 8, such that the first case 4 and the second case 7 can be folded. An antenna 9 of a non-contact IC card is mounted on the first case 4 side.

In the conventional portable telephone 1 shown in FIG. 13, in order to use the built-in non-contact IC card, the antenna 9 of the built-in non-contact IC card must be brought close to a reader/writer 10. In this case, normally, a user grips the first case 4 side on which the key operation unit 2 and the microphone 3 are mounted. However, the hand of the user gripping the first case 4 hinders the antenna 9 of the non-contact IC card from being brought sufficiently close to the reader/writer 10, which leads to a problem. Further, as the first case 4 is gripped, the hand shields the antenna 9 creating a problem in that satisfactory antenna characteristics cannot be securely attained. In other words, the conventional portable telephone 1 shown in FIG. 13 has a problem in that sufficient communication quality cannot be securely obtained between the non-contact IC card and the reader/writer 10. To solve the problem, the user is required to perform an extra operation, such as to change the way to grip the portable telephone 1, which has been burdensome work for the user.

JP 2004-135054 A discloses a portable telephone equipped with a short-patch antenna and a horizontal dipole antenna, and a technology of switching between the short-patch antenna and the horizontal dipole antenna according to a use state of the portable telephone. JP 11-882223 A discloses a card-type radio device that uses a linear loop antenna when used as a radio modem, and uses a flat-table loop antenna when used as a pager. However, the technologies disclosed in JP 2004-135054 and JP 11-882223 A do not solve the problems of the radio terminal which includes a short-range radio communication function represented by communication between the non-contact IC card and the reader/writer.

SUMMARY OF THE INVENTION

The present invention has been made to solve the foregoing problems.

An exemplary feature of the invention is to provide a folding type radio terminal capable of easily performing short-range radio communication with a predetermined communication device.

In a first aspect of the present invention, a radio terminal includes a first case which includes an operation unit and a first antenna, and a second case which includes a display unit and a second antenna and which is foldably connected to the first case via a hinge. The radio terminal performs short-range radio communication with a predetermined communication device by using at least one of the first antenna and the second antenna.

In a second aspect of the present invention, a radio terminal includes a first case which includes an operation unit and a first antenna, and a second case which includes a display unit, a second antenna, and a third antenna, the second case being foldably connected to the first case via a hinge, and being rotatale about an axis orthogonal to a rotary shaft of the hinge. The radio terminal performs short-range radio communication with a predetermined communication device by using at least one of the first antenna to the third antenna.

The present invention provides each case foldably interconnected via a hinge with an antenna. The antenna is used when short-range radio communication is performed with the predetermined communication device. Accordingly, a user of the radio terminal can easily carry out short-range radio communication with the predetermined communication device without performing any extra operation such as to change the way to grip the radio terminal.

BRIEF DESCRIPTION OF THE DRAWINGS

The above and other objects, features and advantages of the present invention will become apparent from the following detailed description when taken with the accompanying drawings in which.

DETAILED DESCRIPTION OF THE PREFERRED EMBODIMENTS

Figure 1:
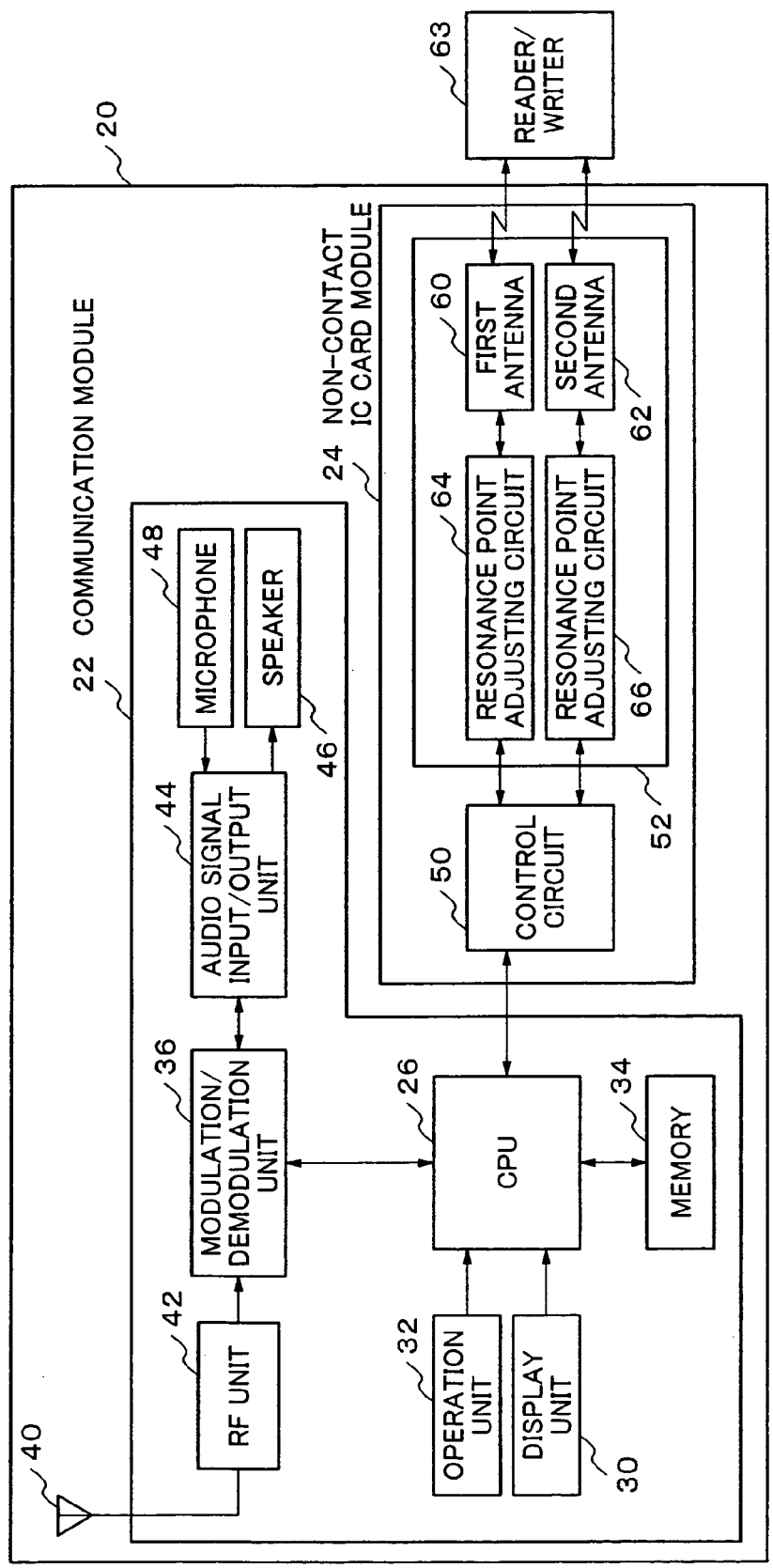
FIG. 1 is a block diagram illustrating a configuration of a radio terminal according to a first embodiment of the present invention.

FIG. 1 is a block diagram illustrating a configuration of a radio terminal 20 according to a first embodiment of the present invention. The radio terminal 20 shown in FIG. 1 performs short-range radio communication with a predetermined communication device. Hereinafter, description will be made with the predetermined communication device set as a reader/writer 63 which is a terminal dedicated to processing data in a non-contact IC card. Known examples of communication specifications include ISO 14443 having a communication range of several tens of centimeters which is so-called a "proximate type". Needless to say, the communication device that performs short-range radio communication with the radio terminal 20 is not limited to the reader/writer 63 for the non-contact IC card. For example, one of communication devices corresponding to other short-range radio communication specifications such as Bluetooth may also be used.

The radio terminal 20 includes a communication module 22 and a non-contact IC card module 24.

The communication module 22 is basically equipped with a central processing unit (CPU) 26 for controlling the entire communication module 22. The CPU 26 is connected to a display unit 30, an operation unit 32, a memory 34, a modulation/demodulation unit 36, and a non-contact IC card module 24.

The CPU 26 mainly controls the modulation/demodulation unit 30 to realize a communication function. Additionally, the CPU 26 communicates with the non-contact IC card module 24 when necessary.

The display unit 30 is constituted of a liquid crystal display (LCD) or the like, and displays visual information such as a character or an image. The operation unit 32 is constituted of keys, a pointing device, or the like. The memory 34 stores various control programs and data. The modulation/demodulation unit 36 realizes a communication function based on control of the CPU 26. Specifically, the modulation/demodulation unit 36 demodulates a radio signal received through a base station (not shown), an antenna 40, and an RF unit 42, and outputs the demodulated signal to an audio signal input/output unit 44. The signal input to the audio signal input/output unit 44 is output as audio information from a speaker 46. On the other hand, audio information input from a microphone 48 is input through the audio signal input/output unit 44 to the modulation/demodulation unit 36. The modulation/demodulation unit 36 modulates the received signal, and outputs the modulated signal to the RF unit 42.

The non-contact IC card module 24 includes a control circuit 50 and an antenna module 52.

The control circuit 50 controls the entire non-contact IC card module 24. The control circuit 50 is constituted of, for example, an IC chip including a CPU and a memory. The control circuit 50 communicates with the communication module 22 when necessary. The control circuit 50 detects carrier waves received through first and second antennas 60 and 62 (described below) to combine the detected carrier waves.

The antenna module 52 includes the first and second antennas 60 and 62 to execute radio communication with the reader/writer 63. The first antenna 60 is connected to the control circuit 50 through a resonance point adjusting circuit 64. The second antenna 62 is connected to the control circuit 52 through a resonance point adjusting circuit 66. The resonance point adjusting circuits 64 and 66 are constituted of, for example, variable capacitance elements, and adjusted to resonate with inductances of the antennas 60 and 62 at 13.56 MHz.

Figure 2:
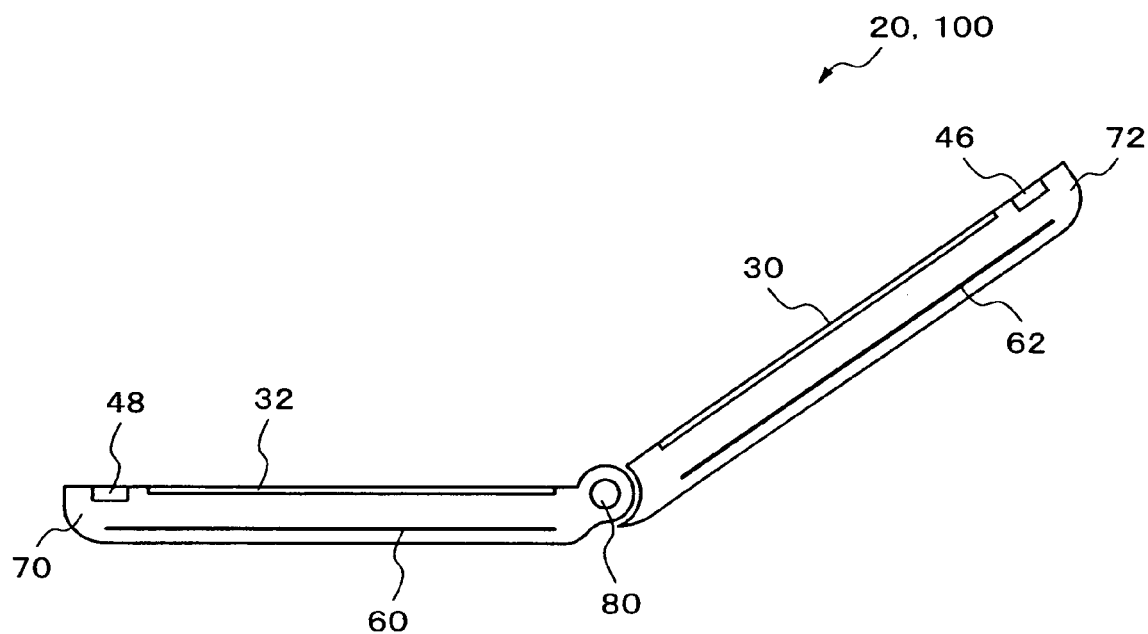
FIG. 2 is a sectional diagram of a radio terminal in its unfolded state according to each of first and second embodiments of the present invention.

FIG. 2 is a sectional diagram of the radio terminal 20 according to the first embodiment of the present invention. As can be understood from FIG. 2, the radio terminal 20 is a folding type radio terminal. Specifically, the radio terminal 20 is configured by interconnecting: a first case 70 which includes the operation unit 32 and the microphone 48; and a second case 72 which includes the display unit 30 and the speaker 46, via a hinge 80, such that the first case 70 and the second case 72 can be folded. The first antenna 60 is disposed in the first case 70, while the second antenna 62 is disposed in the second case 72.

In this case, the first antenna 60 may be arranged on a back side of the first case 70, i.e., a surface side opposite to a surface in which the operation unit 32 is arranged. Further, the second antenna 62 may be arranged on a back side of the second case 72, i.e., a surface side opposite to a surface in which the display unit 30 is arranged. Such arrangements can reduce, e.g., shielding objects as much as possible between the first and second antennas 60 and 62 and the reader/writer 63, whereby antenna characteristics are improved.

An operation of the radio terminal 20 according to the first embodiment of the present invention will be described. As an operation of the communication module 22 of the radio terminal 20 is well-known, description thereof will be omitted. Thus, an operation of the non-contact IC card module 24 will be described below.

The control circuit 50 that is included in the non-contact IC module 24 obtains electric power by mutual induction of magnetic flux generated by the reader/writer 63. The control circuit 50 receives a modulated wave of amplitude deviation modulation (ASK) from the reader/writer 63 through the first antenna 60 or the second antenna 62. The control circuit 50 demodulates the received modulated wave to obtain reception data. The control circuit 50 load-modulates response data corresponding to the reception data by a carrier wave of 13.56 MHz, and transmits the load-modulated response data through the first antenna 60 or the second antenna 62 to the reader/writer 63.

As described above, the radio terminal 20 of the first embodiment of the present invention includes the antennas disposed in the first and second cases 70 and 72 to communicate with the reader/writer 63. Thus, as shown in FIG. 2, when the radio terminal 20 is in an unfolded state, a user only needs to hold the second case 72 to the reader/writer 63 while gripping the first case 70. In this case, as the second case 72 includes the second antenna 62, a hand of the user or the like does not interfere, or the user does not need to change the way to grip the radio terminal 20.

Figure 3:
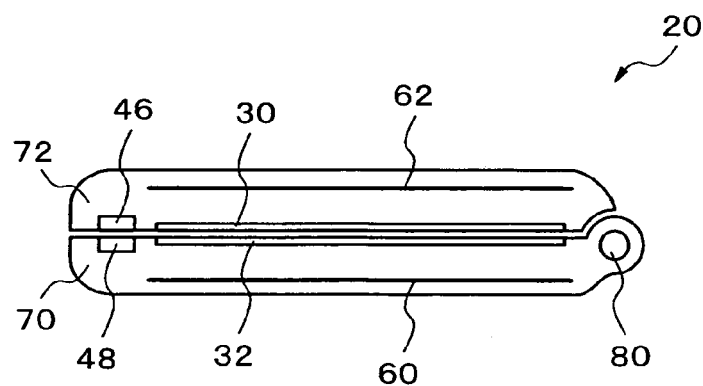
FIG. 3 is a sectional diagram of the radio terminal in its folded state according to the first embodiment of the present invention.

On the other hand, as shown in FIG. 3, when the radio terminal 20 is in a folded state, the user only needs to grip one of the first and second cases 70 and 72 and to hold the other case to the reader/writer 63. In this case, at least one of the first and second antennas 60 and 62 executes radio communication with the reader/writer 63.

In short, according to the radio terminal 20 of the first embodiment, the user can easily use the non-contact IC card without performing any extra operation irrespective of the opened/closed state of the radio terminal 20.

Figure 4:
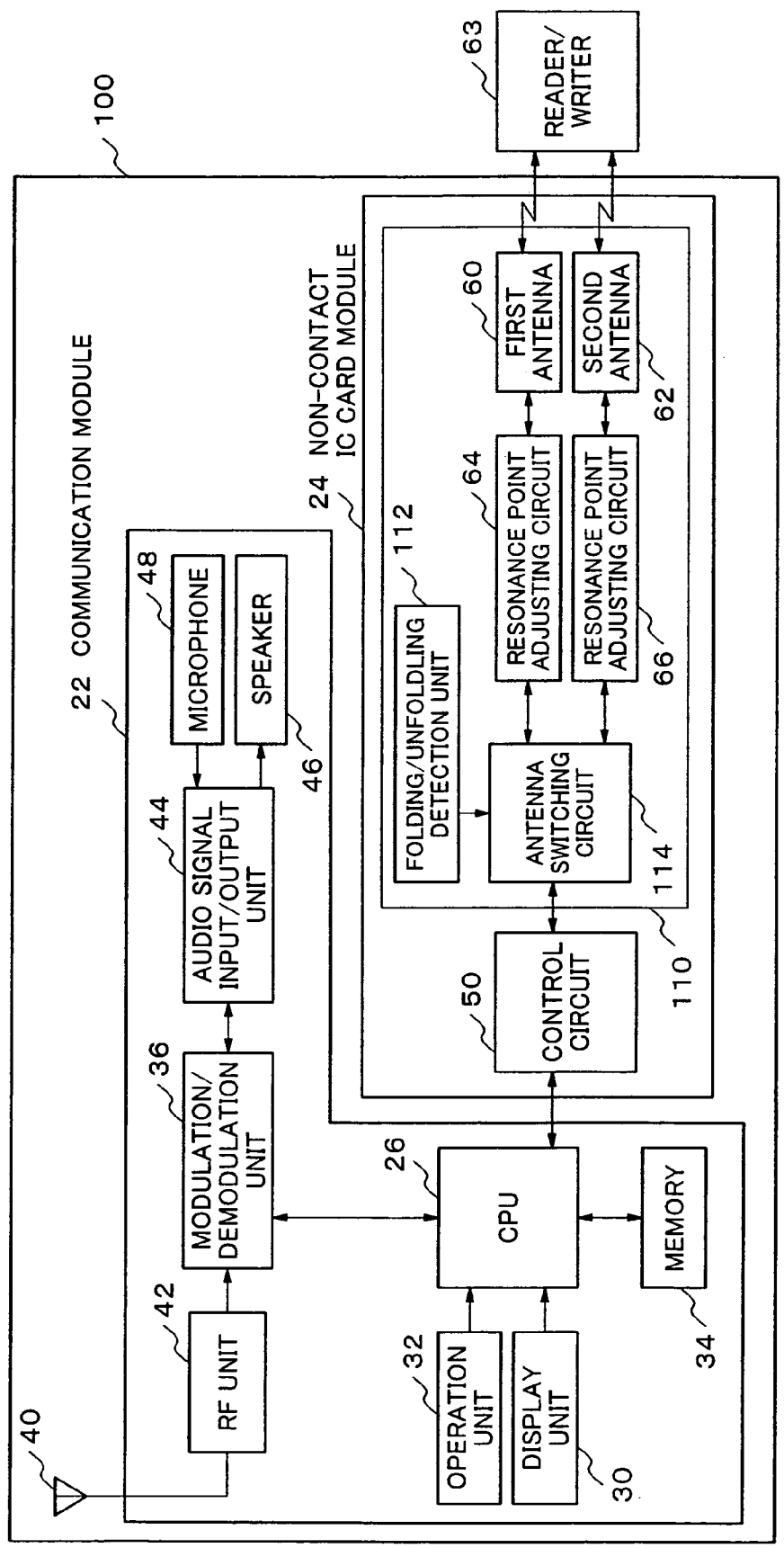
FIG. 4 is a block diagram illustrating a configuration of the radio terminal according to the second embodiment of the present invention.

FIG. 4 is a block diagram illustrating a configuration of a radio terminal 100 according to a second embodiment of the present invention. A difference between the radio terminal 100 according to the second embodiment shown in FIG. 4 and the radio terminal 20 according to the first embodiment shown in FIG. 1 is a configuration of an antenna module. Thus, components other than the antenna module in the radio terminals 100 and 20 are similar. In FIG. 4, components similar to those of FIG. 1 are denoted by similar reference numerals, and description thereof will be omitted.

An antenna module 110 shown in FIG. 4 is configured by including a folding/unfolding detection unit 112 of the radio terminal 100 and an antenna switching circuit 114 for selecting an antenna to execute radio communication with a reader/writer 63 based on a detection signal of the folding/unfolding detection unit 112 in addition to the configuration of the antenna module 52 of FIG. 1. In this case, first and second antennas 60 and 62, and resonance point adjusting circuits 64 and 66 are similar in configuration to those of the radio terminal 20 of FIG. 1. Thus, description thereof will be omitted.

The folding/unfolding detection unit 112 detects a folded/unfolded state of the radio terminal 100, and outputs a folded/unfolded state signal to the antenna switching circuit 114. For example, the folding/unfolding detection unit 112 outputs a signal of an "H" level when the radio terminal 100 is in an unfolded state, and a signal of an "L" level when the radio terminal 100 is in a folded state. The folding/unfolding detection unit 112 can be constituted of, for example, an optical sensor and a contact sensor.

The antenna switching circuit 114 sets an antenna for executing radio communication with the reader/writer 63 as a first antenna 60 when the radio terminal 100 is in a folded state. The antenna switching circuit 114 sets an antenna for executing radio communication with the reader/writer 63 as a second antenna 62 when the radio terminal 100 is in an unfolded state.

FIG. 2 is a sectional diagram of the radio terminal 100 in its unfolded state. As can be understood from FIG. 2, the radio terminal 100 is a folding type radio terminal. Specifically, the radio terminal 100 is configured by interconnecting: a first case 70 which includes an operation unit 32 and a microphone 48; and a second case 72 which includes a display unit 30 and a speaker 46, via a hinge 80, such that the first case 70 and the second case 72 can be folded. The first antenna 60 is disposed within the first case 70, while the second antenna 62 is disposed within the second case 72.

In this case, the first antenna 60 may be arranged on a back side of the first case 70, i.e., a surface side opposite to a surface in which the operation unit 32 is arranged. Further, the second antenna 62 may be arranged on a back side of the second case 72, i.e., a surface side opposite to a surface in which the display unit 30 is arranged. Such arrangements can reduce, e.g., shielding objects as much as possible between the first and second antennas 60 and 62 and the reader/writer 63, whereby antenna characteristics are improved.

Figure 5:
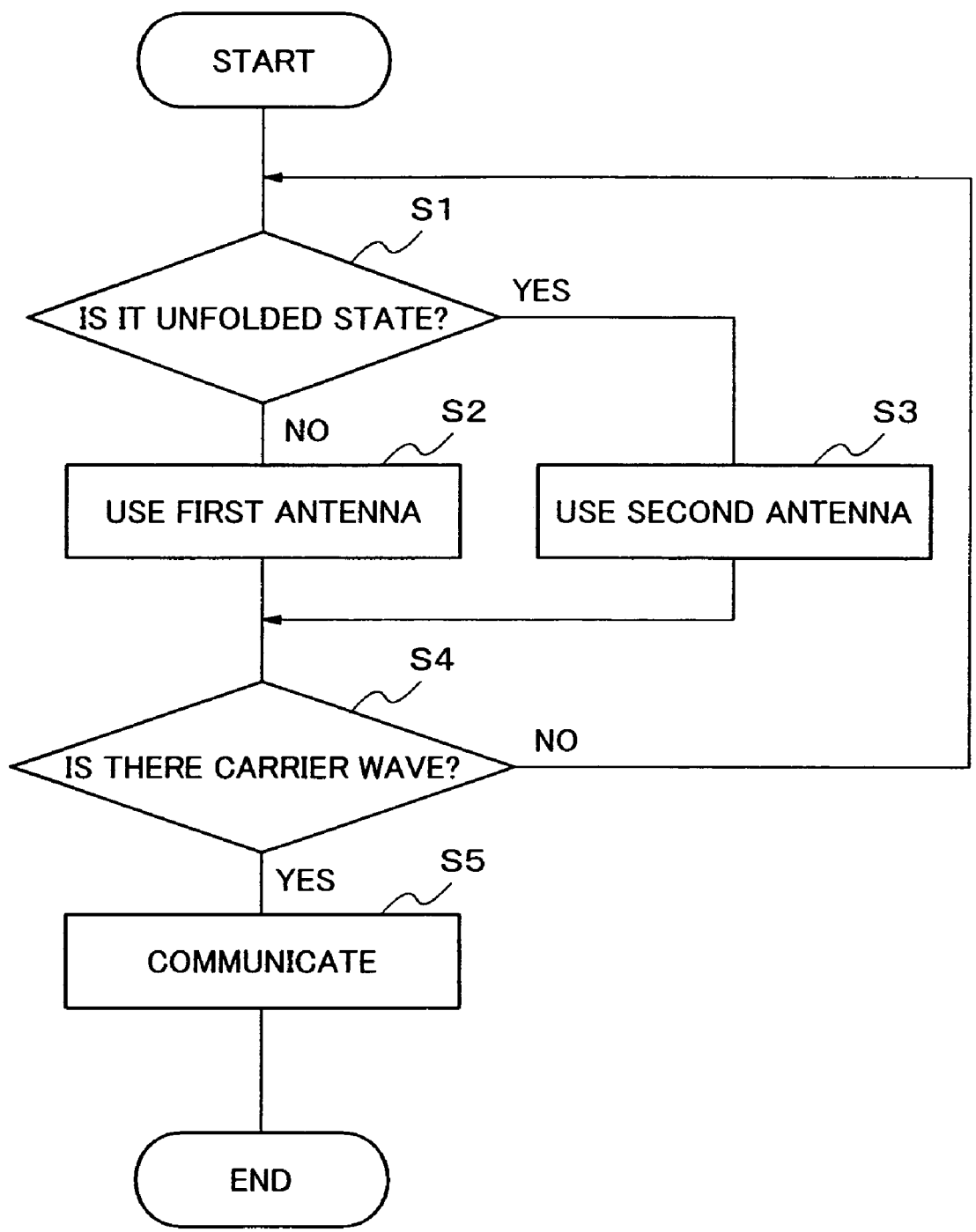
FIG. 5 is a flowchart illustrating an operation of the radio terminal according to the second embodiment of the present invention.

An operation of the radio terminal 100 according to the second embodiment of the present invention will be described with reference to a flowchart of FIG. 5.

The folding/unfolding detection unit 112 determines whether the radio terminal 100 is in an unfolded state or folded state (step S1). If the radio terminal 100 is in a folded state, the antenna switching circuit 114 sets an antenna for executing radio communication with the reader/writer 63 as a first antenna 60 (step S2). On the other hand, if the radio terminal 100 is in an unfolded state, the antenna switching circuit 114 sets an antenna for executing radio communication with the reader/writer 63 as a second antenna 62 (step S3). Next, the control circuit 50 determines whether a carrier wave of 13.56 MHz is received from the reader/writer 63 (step S4). Upon detection of a carrier wave, the control circuit 50 performs radio communication with the reader/writer 63 by using the antennas decided in the steps S1 to S3 (step S5).

As described above, the antenna switching circuit 114 that is included in the radio terminal 100 according to the second embodiment of the present invention automatically sets the antenna for executing radio communication with the reader/writer 63 as the second antenna 62 when the radio terminal 100 is in the unfolded state as shown in FIG. 2. Thus, a user only needs to hold the second case 72 to the reader/writer 63 while gripping the first case 70 without changing the way of gripping.

Figure 11:
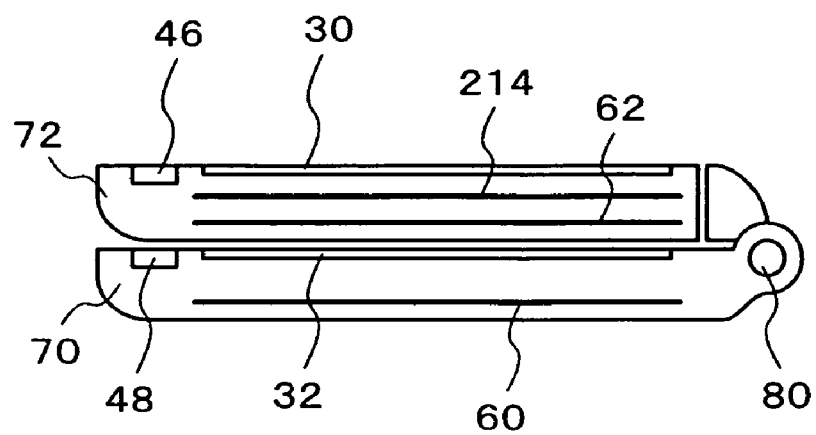
FIG. 11 is a sectional diagram of the radio terminal in its reverse folded state according to the third embodiment of the present invention.

As described above, the antenna switching circuit 114 that is included in the radio terminal 200 according to the third embodiment of the present invention automatically sets the antenna for executing radio communication with the reader/writer 63 as the third antenna 214 when the radio terminal 200 is in the reverse folded state as shown in FIG. 11. The third antenna 214 is disposed near the display unit 30 in the second case 72. Thus, a user only needs to hold the display unit 30 side of the second case 72 to the reader/writer 63 while gripping the first case 70 side of the radio terminal 200. In other words, the user can easily use the non-contact IC card without performing any extra operation.

On the other hand, as shown in FIG. 3, when the radio terminal 100 is in the folded state, the antenna switching circuit 114 automatically sets the antenna for executing radio communication with the reader/writer 63 as the first antenna 60. Thus, for example, the user only needs to hold the first case 70 side to the reader/writer 63 while gripping the second case 72 side from above.

As described above, according to the radio terminal 100 of the second embodiment, the user can easily use the non-contact IC card without any extra operation irrespective of the folding/unfolding state of the radio terminal 100.

In the foregoing, the first antenna 60 is selected in a fixed manner when the radio terminal 100 is in the folded state. However, the invention is not necessarily limited to this configuration. For example, the antenna switching circuit 114 can be configured to generate a combined signal of the first and second antennas 60 and 62 and this combined signal is selected. Alternatively, the antenna switching circuit 114 can be configured to select one of the first and second antennas 60 and 62 that has higher radio wave quality (field intensity)

Figure 6:
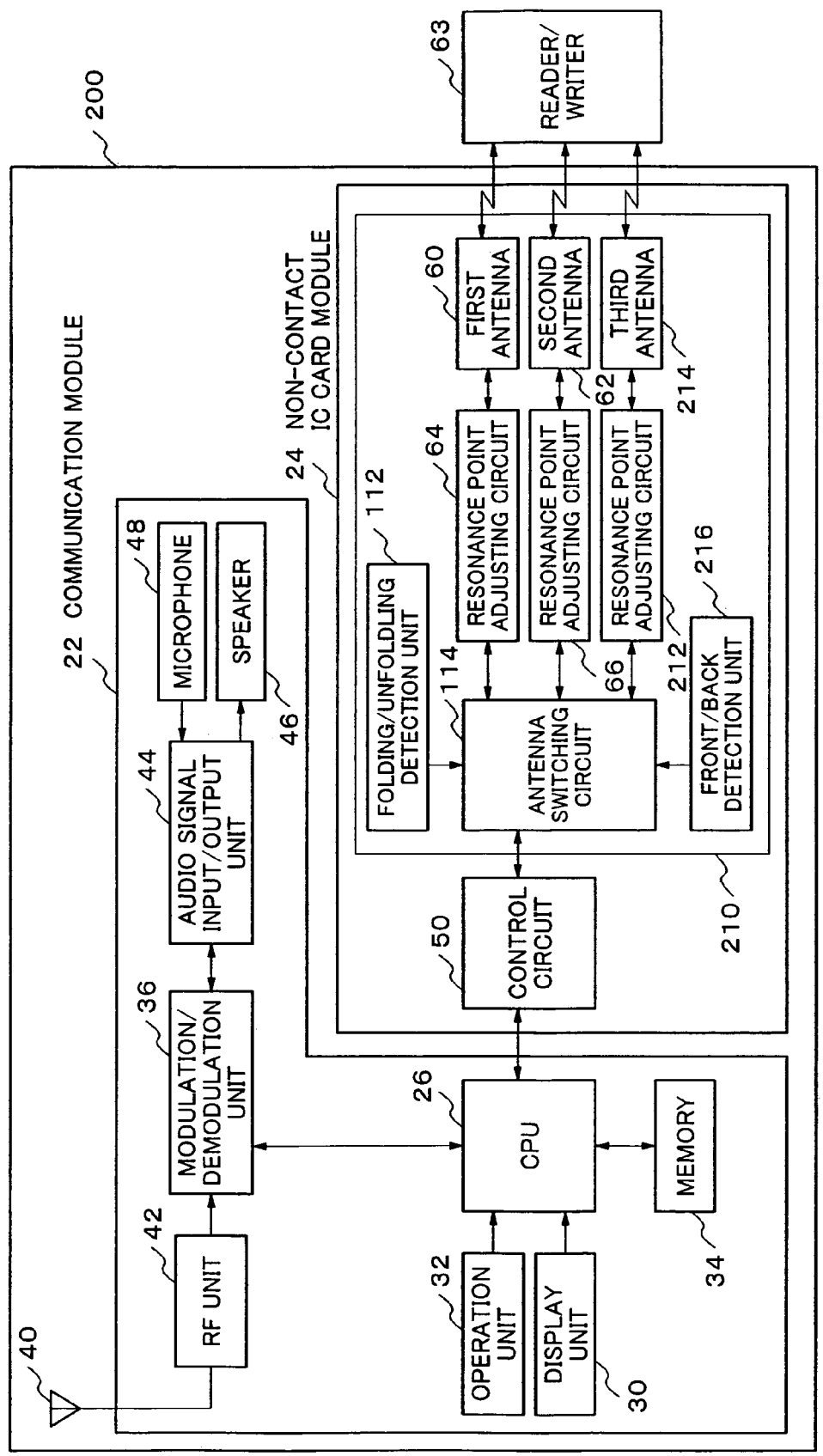
FIG. 6 is a block diagram illustrating a configuration of a radio terminal according to a third embodiment of the present invention.

FIG. 6 is a block diagram illustrating a configuration of a radio terminal 200 according to a third embodiment of the present invention. The radio terminal 200 according to the third embodiment shown in FIG. 6 is a modification of the radio terminal 100 of FIG. 4. A difference from the radio terminal 100 of FIG. 4 is a configuration of an antenna module. Thus, components other than the antenna module in the radio terminals 100 and 200 are similar. In FIG. 6, components similar to those of FIG. 4 are denoted by similar reference numerals, and description thereof will be omitted.

An antenna module 210 shown in FIG. 6 is configured by including a third antenna 214 accompanied by a resonance point adjusting circuit 212, and a front/back detection unit 216 in addition to the configuration of the antenna module 110 of FIG. 4. In this case, first and second antennas 60 and 62, resonance point adjusting circuits 64 and 66, a folding/unfolding detection unit 112, and an antenna switching circuit 114 are similar in configuration to those of the radio terminal 100 of FIG. 4. Thus, description thereof will be omitted.

The resonance point adjusting circuit 212 adjusted to resonate with an inductance of the third antenna 214 at 13.56 MHz is disposed between the third antenna 214 and the antenna switching circuit 114.

The front/back detection unit 216 detects a rotated state of the second case 72 around a rotary shaft Y (described below), and outputs a rotated state signal to the antenna switching circuit 114. For example, the front/back detection unit 216 outputs a signal of an "H" level when a rotational angle is 0°, and a signal of an "L" level when a rotational angle is 180°. The front/back detection unit 216 can be constituted of, for example, an optical sensor and a contact sensor.

Figure 7:
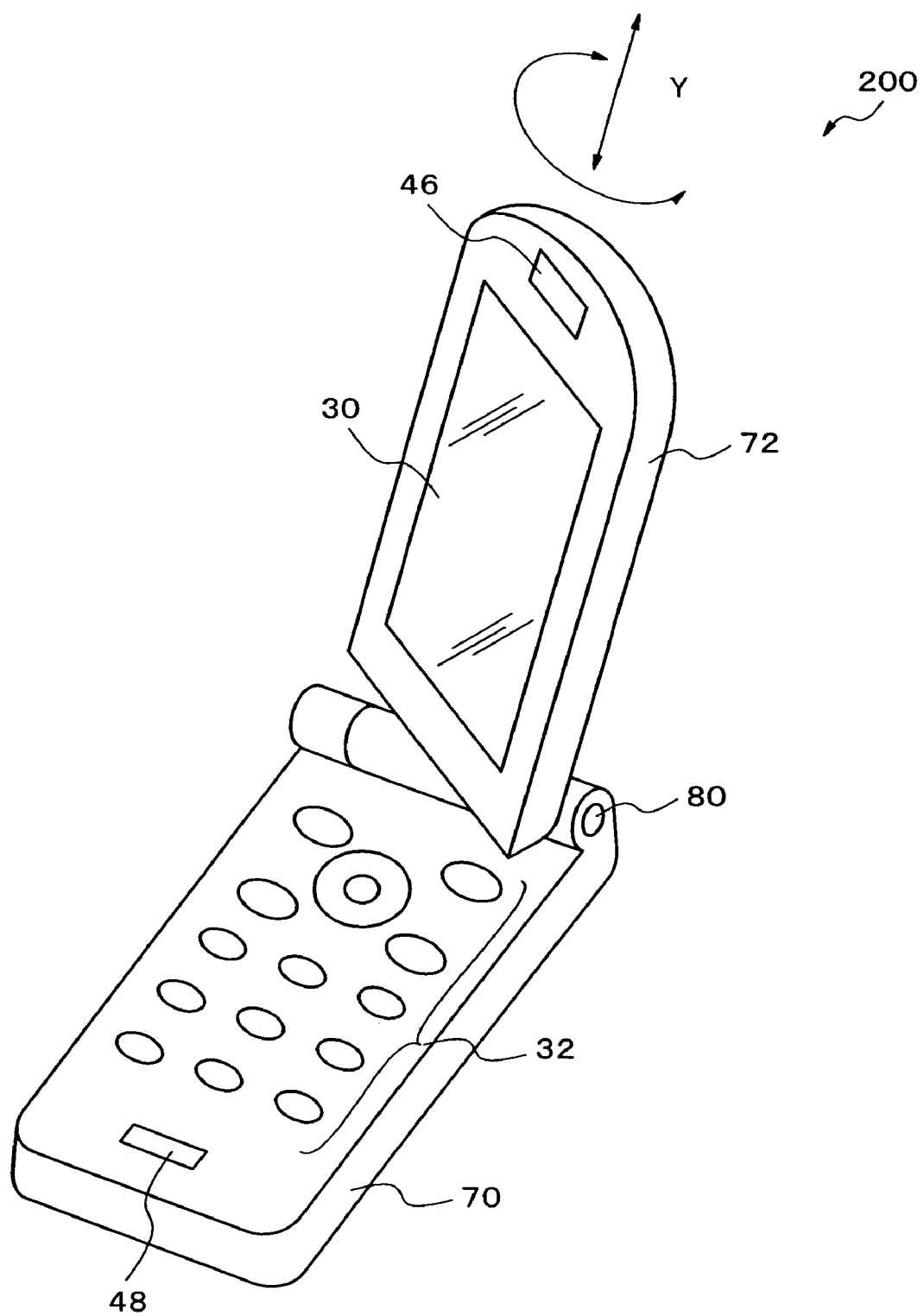
FIG. 7 is a perspective explanatory diagram of the radio terminal according to the third embodiment of the present invention.

FIG. 7 is a perspective explanatory diagram of the radio terminal 200 according to the third embodiment of the present invention. As can be understood from FIG. 7, the radio terminal 200 is a foldable radio terminal having a biaxial hinge structure. Specifically, the radio terminal 200 is configured by interconnecting: a first case 70 including an operation unit 32; and a second case 72 including a display unit 30, via a hinge 80, such that the first case 70 and the second case 72 can be folded. Further, the hinge 80 can rotate the second case 72 about a rotary shaft (rotary shaft indicated by an arrow Y in FIG. 7) orthogonal to a rotary shaft of the hinge 80 at a predetermined angle, e.g., 180°. Hereinafter, a state of the display unit 30 of the second case 72 directed to the operation unit 32 side (non-rotated state on the orthogonal rotary shaft Y) will be defined as "state directed to front". On the other hand, a state of the display unit 30 of the second case 72 directed in a direction opposite to the operation unit 32 (rotated state by 180° on the orthogonal rotary shaft Y) will be defined as "state directed to back".

Figure 8:
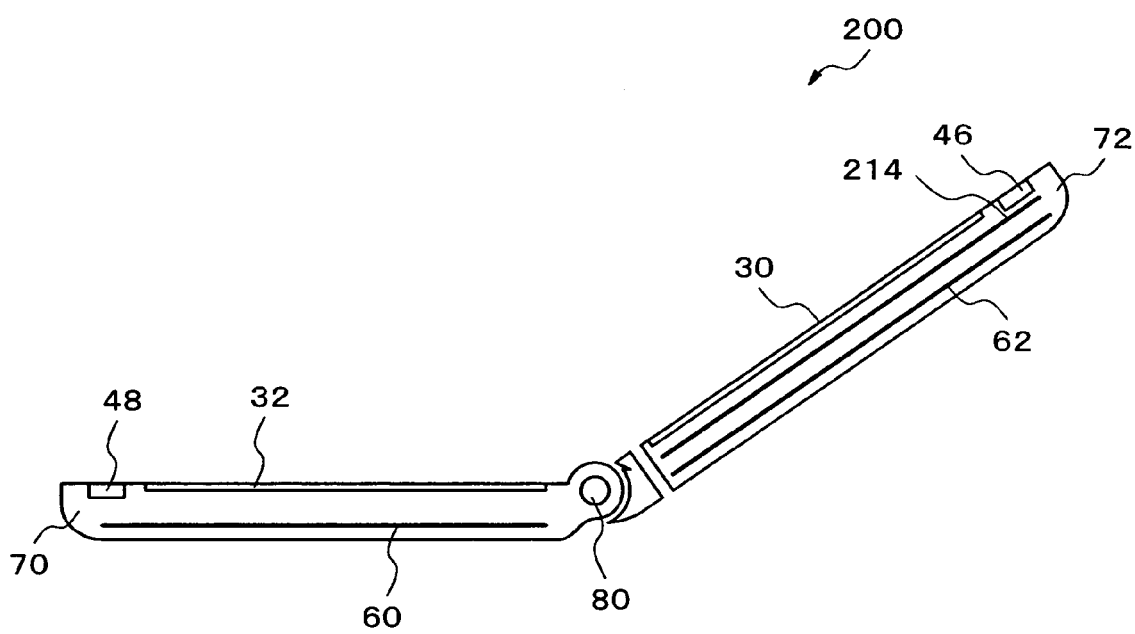
FIG. 8 is a sectional diagram of the radio terminal in its unfolded state according to the third embodiment of the present invention.

FIG. 8 is a sectional diagram of the radio terminal 200 in its opened state. As can be understood from FIG. 8, the first antenna 60 is disposed in the first case 70. The second and third antennas 62 and 214 are disposed in the second case 72.

In this case, the first antenna 60 may be arranged in a back side of the first case 70, i.e., a surface side opposite to the operation unit 32, the second antenna 62 may be arranged in a backside of the second case 72, i.e., a surface side opposite to the display unit 30, and the third antenna 214 may be arranged in a front side of the second case 72, i.e., a surface side in which the display unit 30 is arranged. Such arrangements can reduce shielding objects as much as possible between the antenna and the reader/writer 63, whereby antenna characteristics can be improved.

Figure 9:
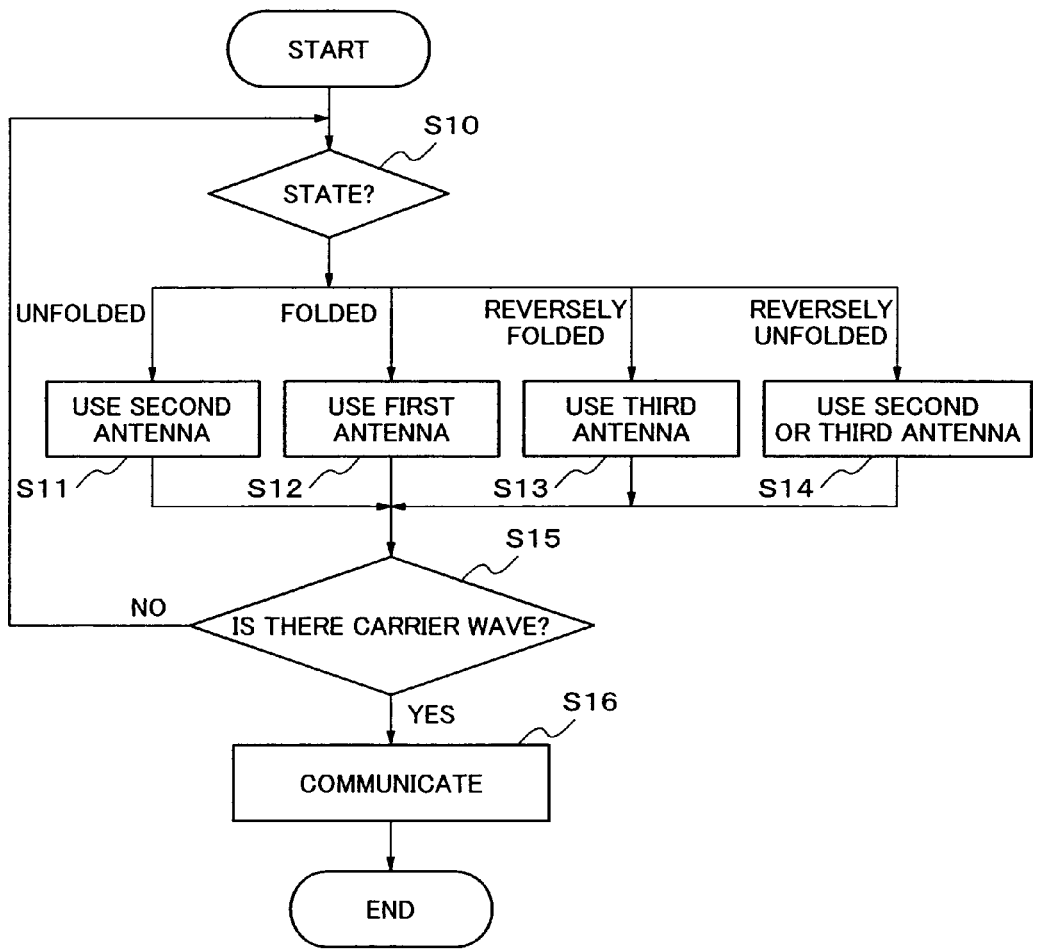
FIG. 9 is a flowchart illustrating an operation of the radio terminal according to the third embodiment of the present invention.

An operation of the radio terminal 200 according to the third embodiment of the present invention will be described with reference to a flowchart of FIG. 9.

Figure 10:
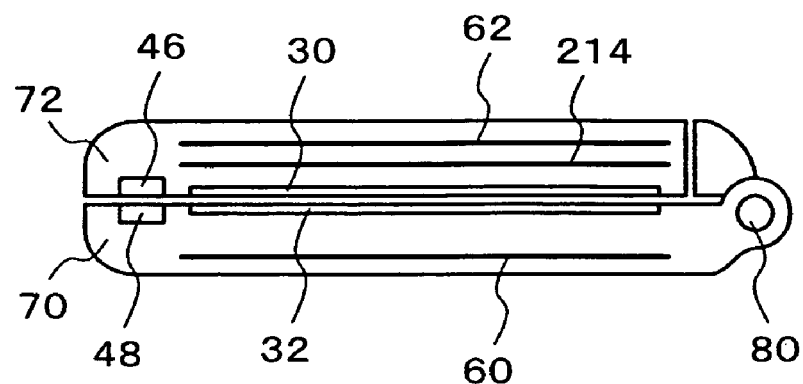
FIG. 10 is a sectional diagram of the radio terminal in its folded state according to the third embodiment of the present invention.
Figure 12:
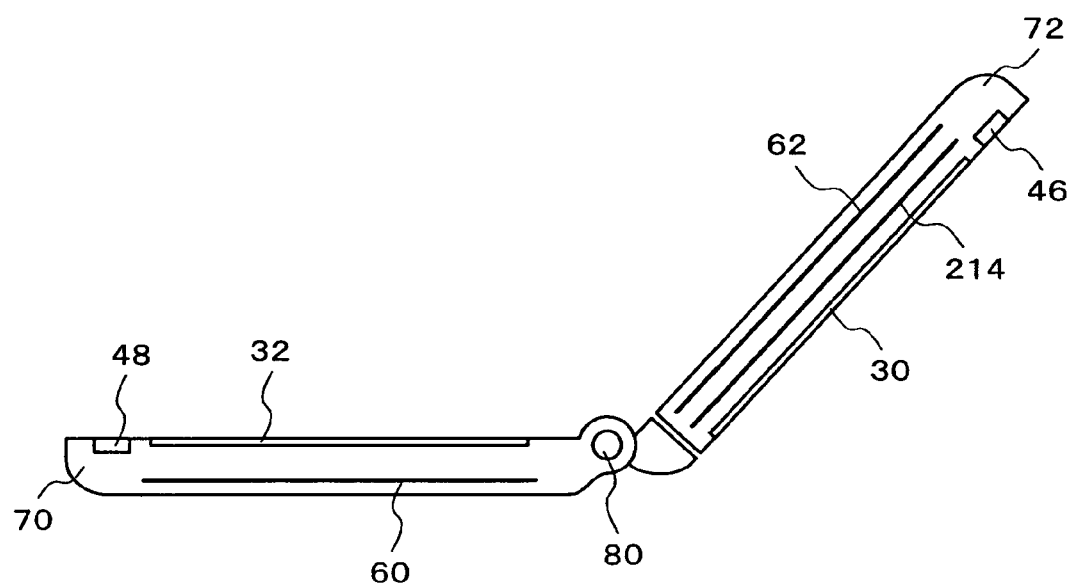
FIG. 12 is a sectional diagram of the radio terminal in its reverse unfolded state according to the third embodiment of the present invention.
Figure 13:
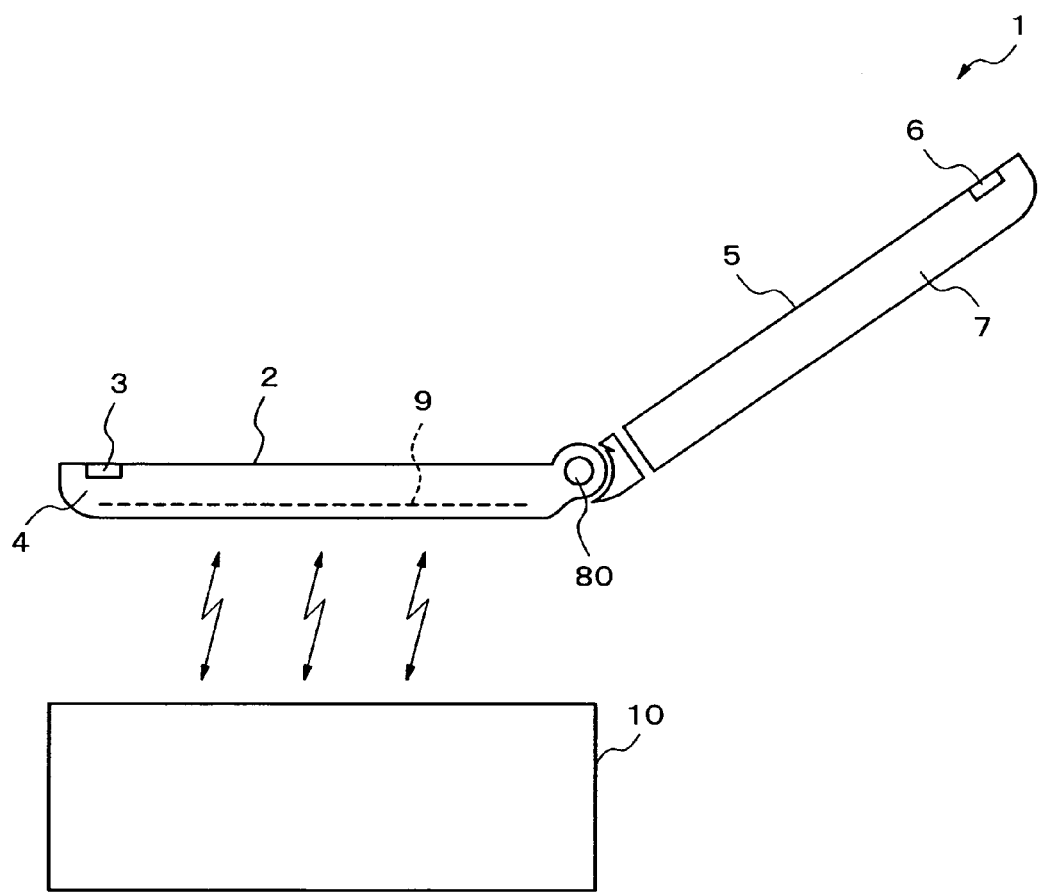
FIG. 13 is a sectional diagram of a conventional portable telephone showing a mounting position of a non-contact IC card antenna.

The antenna switching circuit 114, determines a state of the radio terminal 200 based on a folded/unfolded state signal from the folding/unfolding detection unit 112 and a rotated state signal from the front/back detection unit 216 (step S10). In other words, determination is made as to an unfolded state, a folded state, a reverse folded state, or are verse unfolded state. In this case, as shown in FIG. 8, "unfolded state" is an unfolded state of the radio terminal 200, indicating that the display unit 30 of the second case 72 is directed to the front side. As shown in FIG. 10, "folded state" is a folded state of the radio terminal 200, indicating that the display unit 30 of the second case 72 is directed to the front side. As shown in FIG. 11, "reverse folded state" is a folded state of the radio terminal 200, indicating that the display unit 30 of the second case 72 is directed to the back side. As shown in FIG. 12, "reverse unfolded state" is an unfolded state of the radio terminal 200, indicating that the display unit 30 of the second case 72 is directed to the back side. When the radio terminal 200 is in an unfolded state as shown in FIG. 8, the antenna switching circuit 114 sets an antenna for executing radio communication with the reader/writer 63 as a second antenna 62 (step S11). When the radio terminal 200 is in a folded state as shown in FIG. 10, the antenna switching circuit 114 sets an antenna for executing radio communication with the reader/writer 63 as a first antenna 60 (step S12). When the radio terminal 200 is in a reverse folded state as shown in FIG. 11, the antenna switching circuit 114 sets an antenna for executing radio communication with the reader/writer 63 as a third antenna 214 (step S13). When the radio terminal 200 is in a reverse unfolded state as shown in FIG. 12, the antenna switching circuit 114 sets an antenna for executing radio communication with the reader/writer 63 as a second antenna 62 or a third antenna 214 (step S14). Subsequently, the control circuit 50 determines whether a carrier wave of 13.56 MHz is received from the reader/writer 63 (step S15). Upon detection of a carrier wave, the control circuit 50 performs radio communication with the reader/writer 63 by using one of the antennas decided in the steps S10 to S14 (step S16).

As described above, the antenna switching circuit 114 that is included in the radio terminal 200 according to the third embodiment of the present invention automatically sets the antenna for executing radio communication with the reader/writer 63 as the third antenna 214 when the radio terminal 200 is in the reverse folded state as shown in FIG. 11. The third antenna 214 is disposed near the display unit 30 in the second case 72. Thus, a user only needs to hold the display unit 30 side of the second case 72 to the reader/writer 63 while gripping the first case 70 side of the radio terminal 200. In other words, the user can easily use the non-contact IC card without performing any extra operation.

In the foregoing, when the radio terminal 200 is in an unfolded state as shown in FIG. 8, for example, the antenna switching circuit 114 may select the third antenna 214. The antenna switching circuit 114 may combine reception signals of the second and third antennas 62 and 214. Alternatively, the antenna switching circuit 114 may select one of the second and third antennas 62 and 214 that has higher radio wave quality.

Also, when the radio terminal 200 is in a folded state as shown in FIG. 10, the antenna switching circuit 114 may select the second antenna 62. The antenna switching circuit 114, for example, may also combine reception signals of the first and second antennas 60 and 62. Alternatively, the antenna switching circuit 114 may select one of the first and second antennas 60 and 62 that has higher radio wave quality.

When the radio terminal 200 is in a reverse folded state as shown in FIG. 11, the antenna switching circuit 114 may select the first antenna 60. The antenna switching circuit 114, for example, may also combine reception signals of the first and third antennas 60 and 214. Alternatively, the antenna switching circuit 114 may select one of the first and third antennas 60 and 214 that has higher radio wave quality.

When the radio terminal 200 is in a reverse unfolded state as shown in FIG. 12, the antenna switching circuit 114 may select the second antenna 62. The antenna switching circuit 114, for example, may also combine reception signals of the second and third antennas 62 and 214. Alternatively, the antenna switching circuit 114 may select one of the second and third antennas 62 and 214 that has higher radio wave quality.

Needless to say, the radio terminals 20, 100, and 200 of the first to third embodiments can deal with not only the non-contact IC card of a use frequency 13.56 MHz but also non-contact IC cards of other use frequencies.

The radio terminals 20, 100, and 200 are well-known terminal devices such as portable telephones, personal handyphone systems (PHS), or personal digital assistants (PDA).

While the present invention has been described in connection with certain preferred embodiments, it is to be understood that the subject matter encompassed by the present invention is not limited to those specific embodiments. On the contrary, it is intended to include all alternatives, modifications, and equivalents as can be included within the spirit and scope of the following claims.

Further, it is the inventor's intent to retain all equivalents of the claimed invention even if the claims are amended during prosecution.

What is claimed is:

1. A radio terminal comprising:
   a first case which includes an operation unit and a first antenna; and
   a second case which includes a display unit and a second antenna and which is foldably connected to the first case via a hinge,
   wherein in a folded state the radio terminal performs short-range radio communication with a predetermined communication device by selecting one of the first antenna and the second antenna that has higher quality of radio wave reception, the first antenna and the second antenna each having a linear cross-section.

2. A radio terminal according to claim 1, wherein the first antenna is arranged on a surface side opposite to a surface in which the operation unit of the first case is arranged.

3. A radio terminal according to claim 1, wherein the second antenna is arranged on a surface side opposite to a surface in which the display unit of the second case is arranged.

4. A radio terminal according to claim 1, further comprising a folding/unfolding detection circuit which detects the folded state or an unfolded state of the radio terminal.

5. A radio terminal according to claim 4, further comprising an antenna switching circuit which selects at least one of the first antenna and the second antenna based on a detection result of the folding/unfolding detection circuit.

6. A radio terminal according to claim 5, wherein the second antenna is selected when the folding/unfolding detection circuit detects an unfolded state of the radio terminal.

7. A radio terminal according to claim 5, wherein the first antenna is selected when the folding/unfolding detection circuit detects the folded state of the radio terminal.

8. A radio terminal according to claim 5, wherein the first antenna and the second antenna are both selected when the folding/unfolding detection circuit detects the folded state of the radio terminal.

9. A radio terminal according to claim 5, wherein one of the first antenna and the second antenna that has higher quality of radio wave reception is selected when the folding/unfolding detection circuit detects the folded state of the radio terminal.

10. A radio terminal according to claim 1, wherein the radio terminal is a portable telephone.

11. A radio terminal, comprising:
    a first case which includes an operation unit and a first antenna; and
    a second case which includes a display unit, a second antenna, and a third antenna, the second case being foldably connected to the first case via a hinge, and being rotatable about an axis orthogonal to a rotary shaft of the hinge,
    wherein the radio terminal performs short-range radio communication with a predetermined communication device by using at least one of the first antenna to the third antenna.

12. A radio terminal according to claim 11, wherein the first antenna is arranged on a surface side opposite to a surface in which the operation unit of the second case is arranged.

13. A radio terminal according to claim 11, wherein the second antenna is arranged on a surface side opposite to a surface in which the display unit of the second case is arranged.

14. A radio terminal according to claim 11, wherein the third antenna is arranged on a surface side in which the display unit of the second case is arranged.

15. A radio terminal according to claim 11, further comprising a folding/unfolding detection circuit which detects a folded state or an unfolded state of the radio terminal.

16. A radio terminal according to claim 15, further comprising a front/back detection circuit which detects a front directed state or a back directed state of the display unit of the second case.

17. A radio terminal according to claim 16, further comprising an antenna switching circuit which selects at least one of the first antenna to the third antenna based on detection results of the folding/unfolding detection circuit and the front/back detection circuit.

18. A radio terminal according to claim 17, wherein at least one of the first antenna and the third antenna is selected when the radio terminal is in a folded state and the display unit of the second case is in a back directed state.

19. A radio terminal according to claim 17, wherein at least one of the first antenna and the third antenna that has higher radio wave quality is selected when the radio terminal is in a folded state and the display unit of the second case is in a back directed state.

20. A radio terminal according to claim 17, wherein at least one of the second antenna and the third antenna is selected when the radio terminal is in an unfolded state and the display unit of the second case is in a front directed state.

21. A radio terminal according to claim 17, wherein at least one of the second antenna and the third antenna that has higher radio wave quality is selected when the radio terminal is in an unfolded state and the display unit of the second case is in a front directed state.

22. A radio terminal according to claim 17, wherein at least one of the second antenna and the third antenna is selected when the radio terminal is in an unfolded state and the display unit of the second case is in a back directed state.

23. A radio terminal according to claim 17, wherein at least one of the second antenna and the third antenna that has higher radio wave quality is selected when the radio terminal is in an unfolded state and the display unit of the second case is in a back directed state.

24. A radio terminal according to claim 17, wherein at least one of the first antenna and the third antenna is selected when the radio terminal is in a folded state and the display unit of the second case is in a front directed state.

25. A radio terminal according to claim 17, wherein at least one of the first antenna and the third antenna that has higher radio wave quality is selected when the radio terminal is in a folded state and the display unit of the second case is in a front directed state.

26. A radio terminal, comprising:
a first case which includes an operation unit and a first antenna; and
a second case which includes a display unit and a second antenna and which is foldably connected to the first case via a hinge,
wherein the radio terminal performs short-range radio communication with a predetermined communication device by using at least one of the first antenna and the second antenna wherein the predetermined communication device is a reader/writer for performing communication with a non-contact IC card.

* * * * *